(12) United States Patent
Furukawa et al.

(10) Patent No.: US 11,898,070 B2
(45) Date of Patent: *Feb. 13, 2024

(54) ADHESIVE TAPE AND ELECTRONIC DEVICE

(71) Applicant: DIC Corporation, Tokyo (JP)

(72) Inventors: Yoshimi Furukawa, Saitama (JP); Yuuya Kitade, Saitama (JP); Yuusuke Takahashi, Tokyo (JP); Takeshi Iwasaki, Saitama (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,657

(22) Filed: Jun. 24, 2022

(65) Prior Publication Data

US 2023/0026124 A1  Jan. 26, 2023

(30) Foreign Application Priority Data

Jul. 8, 2021 (JP) .................................. 2021-113394

(51) Int. Cl.
*C09J 7/26* (2018.01)
*C09J 7/38* (2018.01)

(52) U.S. Cl.
CPC ................. *C09J 7/26* (2018.01); *C09J 7/385* (2018.01); *C09J 2433/00* (2013.01)

(58) Field of Classification Search
CPC . C09J 7/26; C09J 7/385; C09J 2433/00; C09J 2301/312
See application file for complete search history.

(56) References Cited

U.S. PATENT DOCUMENTS

| 10,093,835 | B2 * | 10/2018 | Yamakami | C09J 7/29 |
| 10,793,755 | B2 * | 10/2020 | Iwasaki | C09J 7/26 |
| 2004/0260024 | A1 * | 12/2004 | Gehlsen | C09J 7/22 |
| | | | | 525/227 |
| 2014/0356615 | A1 * | 12/2014 | Komatsuzaki | C09J 7/26 |
| | | | | 428/315.5 |
| 2023/0022110 | A1 * | 1/2023 | Furukawa | C09J 183/04 |

FOREIGN PATENT DOCUMENTS

| JP | 2010-260880 A | 11/2010 | |
| WO | WO-2008053840 A1 * | 5/2008 | ................ C09J 5/06 |

OTHER PUBLICATIONS

Machine translation of WO-2008053840-A1. (Year: 2008).*

* cited by examiner

*Primary Examiner* — Patricia L. Nordmeyer
(74) *Attorney, Agent, or Firm* — Osha Bergman Watanabe & Burton LLP

(57) ABSTRACT

Provided are an adhesive tape having high flex resistance that can withstand repeated bending by folding operations and the like while maintaining high impact resistance, and an electronic device including the adhesive tape. The adhesive tape has an adhesive layer on one side or both sides of a foam base directly or with another layer interposed, in which the foam base contains an elastomer resin as a main component. The foam base has a tensile stress of 150 N/cm² or less at 100% strain based on a stress-strain curve and a foam density of 0.2 g/cm³ to 2.0 g/cm³.

8 Claims, 2 Drawing Sheets

ADHESIVE TAPE AND ELECTRONIC DEVICE

TECHNICAL FIELD

One or more embodiments of the present invention relate to an adhesive tape usable for fixing parts of electronic devices such as portable electronic terminals, and to an electronic device.

BACKGROUND

Adhesive tapes are widely used, for example, in situations such as fixing parts of electronic devices. Specifically, the adhesive tapes are used to fix protective panels of image displays, constituting small electronic devices such as portable electronic terminals, cameras, and personal computers, to housings, and to fix rigid parts such as exterior parts and batteries to the small electronic devices.

Double-sided adhesive tapes, for example, having an adhesive layer on both sides of a flexible foam base are known as such adhesive tapes that are thin and highly conformable to adherends (for example, see Japanese Unexamined Patent Application Publication No. 2010-260880).

As electronic devices such as portable electronic terminals are used in a wide variety of situations, there is a demand for the adhesive tapes having impact resistance to such a degree that the parts do not chip or peel off upon impact, for example, when the portable electronic terminals are dropped.

In recent years, foldable smartphones and tablets have been developed. Unfortunately, in adhesive tapes with conventional foam bases, repeated folding operations cause tearing or crease marks or cause full extension or shrinkage of the adhesive tapes, for example, and consequently, adherends such as panels attached by the adhesive tapes easily peel off.

SUMMARY

One or more embodiments of the present invention are to provide an adhesive tape having high flex resistance that can withstand repeated bending by folding operations and the like while maintaining high impact resistance, and an electronic device including the adhesive tape.

One or more embodiments of the present invention are achieved as follows. One or more embodiments of the present invention provide an adhesive tape having an adhesive layer on one side or both sides of a foam base directly or with another layer interposed therebetween, in which the foam base contains an elastomer resin as a main component, and the foam base has a tensile stress of 150 N/cm² or less at 100% strain based on a stress-strain curve and a foam density of 0.2 g/cm³ to 2.0 g/cm³.

In one or more embodiments of the present invention, the foam base may have a compressive strength at 25% of 1 kPa to 300 kPa.

In one or more embodiments of the present invention, the foam base may have an elongation at break of 550% to 800%.

In one or more embodiments of the present invention, the foam base may have a thickness of 50 μm to 500 μm.

In one or more embodiments of the present invention, the adhesive layer may be formed of an acrylic adhesive.

One or more embodiments of the present invention also provide an electronic device including the adhesive tape described above.

One or more embodiments of the present invention provide an adhesive tape having high flex resistance while maintaining high impact resistance, and an electronic device including the adhesive tape.

DETAILED DESCRIPTION OF THE EMBODIMENTS

1. Adhesive Tape

An adhesive tape according to one or more embodiments of the present invention includes an adhesive layer on one side or both sides of a foam base directly or with another layer interposed therebetween, in which the foam base contains an elastomer resin as a main component, and the foam base has a tensile stress of 150 N/cm² or less at 100% strain based on a stress-strain curve and has a foam density of 0.2 g/cm³ to 2.0 g/cm³.

Figure 1:
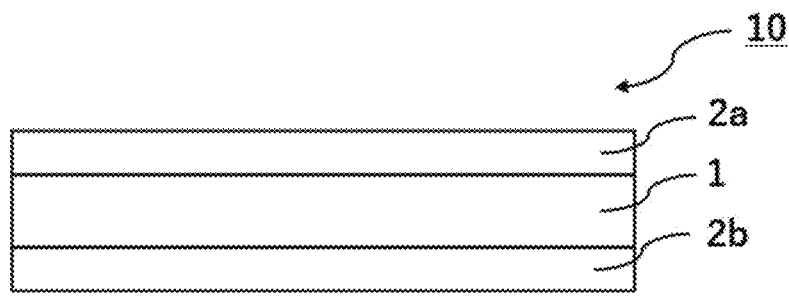
FIG. 1 is a schematic cross-sectional view of an example of an adhesive tape according to one or more embodiments of the present invention.

FIG. 1 is a schematic cross-sectional view of an example of the adhesive tape according to one or more embodiments of the present invention. An adhesive tape 10 according to one or more embodiments of the present invention illustrated in FIG. 1 has an adhesive layer 2a disposed on one side of a foam base 1 and an adhesive layer 2b disposed on the other side of the foam base 1. The foam base 1 has at least predetermined physical properties.

Since the adhesive layers are provided on a foam base that contains an elastomer resin as a main component and satisfies predetermined physical properties, the adhesive tape according to one or more embodiments of the present invention can have high flex resistance while maintaining high impact resistance and achieve both impact resistance and flex resistance.

(Foam Base)

The foam base in the adhesive tape according to one or more embodiments of the present invention contains an elastomer resin as a main component, and at least the tensile stress based on a stress-strain curve at 100% strain and the foam density are within the respective predetermined ranges.

<Material>

The foam base in the adhesive tape according to one or more embodiments of the present invention contains an elastomer resin as a main component. Because of the use of the foam base containing an elastomer resin as a main component, the tape can easily conform to bending and deform without fully extending or shrinking when being bent, can have such a strength that repeated bending operations are less likely to cause crease marks or tearing, and can maintain high impact resistance.

In the foam base, the resin is a main component, and the resin content may be, for example, 90% by mass or more, 95% by mass or more, or 99% by mass or more of the total amount of the foam base.

As used herein, "the foam base contains an elastomer resin as a main component" means that the elastomer resin is contained most abundantly in the foam base and in the resins that constitute the foam base. Specifically, the elastomer resin content in the foam base may be, for example, 50% by mass or more, 70% by mass or more, 90% by mass or more, or 100% by mass of the total amount of resins that constitute the foam base. As used herein, "the elastomer resin content in the foam base is 100% by mass of the total amount of resins that constitute the foam base" means that the foam base is a foam base formed of an elastomer resin (elastomer resin foam base). The elastomer resin foam base may contain optional additives, if necessary.

The elastomer resin that constitutes the foam base may be a thermosetting elastomer resin or a thermoplastic elastomer resin. More specifically, examples of the elastomer resin that constitutes the foam base include: thermosetting elastomers such as acrylonitrile butadiene rubber, ethylene-propylene-diene rubber, ethylene-propylene rubber, natural rubber, polybutadiene rubber, polyisoprene rubber, styrene rubber, silicone rubber, and acrylic rubber; and thermoplastic elastomers such as olefinic thermoplastic elastomers, styrenic thermoplastic elastomers, vinyl chloride thermoplastic elastomers, polyurethane thermoplastic elastomers, polyester thermoplastic elastomers, and polyamide thermoplastic elastomers. These elastomer resins may be used singly or in combination of two or more. Among these elastomer resins, in terms of improving impact resistance, and deformability and strength that can withstand repeated bending, thermoplastic elastomers are preferred, and olefinic thermoplastic elastomers or styrenic thermoplastic elastomers are more preferred.

Both non-crosslinked elastomers and crosslinked elastomers can be used as the thermoplastic elastomer resins. Non-crosslinked elastomers are preferred in terms of effectively enhancing cushioning properties.

The thermoplastic elastomer resins may be a hydrogenated thermoplastic elastomer formed by hydrogenating a polymer that constitutes a thermoplastic elastomer. Specific examples of the hydrogenated thermoplastic elastomer include hydrogenated styrenic thermoplastic elastomers such as SEBC and hydrogenated olefinic thermoplastic elastomers such as CEBC, as described later.

The olefinic thermoplastic elastomers are copolymers in which olefinic thermoplastic resins are main monomers. The olefinic thermoplastic elastomer resins may be a simple blend of a thermoplastic crystalline polyolefin and a rubber component, a dynamically vulcanized type in which partial crosslinking or full crosslinking is introduced into a rubber component by a method such as dynamic vulcanization, or a polymerized type.

Examples of the olefinic thermoplastic elastomer resins include those having polyolefins such as polypropylene and polyethylene in the hard segment and rubber components and/or non-crystalline polyethylene in the soft segment.

Examples of the polyolefins that constitute the hard segment of the olefinic thermoplastic elastomer resins include a homopolymer of α-olefin having 1 to 4 carbon atoms or a copolymer of two or more α-olefins. Specific examples include polypropylene and polyethylene.

Examples of the rubber components that constitute the soft segment of the olefinic thermoplastic elastomer resins include butyl rubber, halobutyl rubber, ethylene-propylene rubber (EPM), ethylene-propylene-diene rubber (EPDM), acrylonitrile-butadiene rubber, NBR, and natural rubber. Among those, ethylene-propylene rubber (EPM) and ethylene-propylene-diene rubber (EPDM) are preferred.

The olefinic thermoplastic elastomer resins may be block copolymers. Examples of the block copolymers of the olefinic thermoplastic elastomer resins include those having crystalline blocks and soft segment blocks. Examples include crystalline olefin-ethylene butylene-crystalline olefin block copolymers (CEBC). In CEBC, the crystalline olefin that constitutes the crystalline block may be crystalline ethylene.

Other examples of the olefinic thermoplastic elastomers include α-olefinic elastomers formed by copolymerization of two or more of α-olefins such as ethylene, propylene, 1-butene, 1-pentene, 1-hexene, and 1-octene. Specific examples of the α-olefinic elastomers include ethylene elastomers, propylene elastomers, and 1-butene elastomers.

Other examples of the olefinic thermoplastic elastomers include elastomer matrix crystalline pseudo-crosslink type olefinic thermoplastic elastomer in which polyolefin resin forms a network structure in an ethylene-propylene rubber matrix.

The styrenic thermoplastic elastomers are copolymers in which styrenic thermoplastic resins are main monomers. Examples of the styrenic thermoplastic elastomers include block copolymers having a polymer or a copolymer block of styrene and a polymer or a copolymer block of a conjugated diene compound, and hydrogenated products thereof. Examples of the conjugated diene compounds include isoprene and butadiene.

More specific examples of the styrenic thermoplastic elastomers include styrene-isoprene block copolymers, styrene-isoprene-styrene block copolymers, styrene-butadiene block copolymers, styrene-butadiene-styrene block copolymers, styrene-ethylene/butylene-styrene block copolymers (SEBS), styrene-ethylene/propylene-styrene block copolymers (SEPS), styrene-ethylene/butylene block copolymers (SEB), styrene-ethylene/propylene block copolymers (SEP), and styrene-ethylene/butylene-crystalline olefin block copolymers (SEBC).

When the resin that constitutes the foam base is a mixture of a thermoplastic elastomer resin and other resin components, the other resin components can be selected as appropriate, for example, in consideration of miscibility with the elastomer. Examples of the other resin components include polyolefin resins, polystyrene resins, polyethylene terephthalate resins, and nylon resins. Examples of the polyolefin resins include polyethylene resins, polypropylene resins, and ethylene-vinyl acetate copolymers. Among those, polyethylene resins are preferred.

The foam base may contain known additives, if necessary, to such an extent that the physical properties are not impaired. Examples of the additives that can be contained in the foam base include colorants, plasticizers, antioxidants, foaming aids such as zinc oxide, bubble nucleation adjusters, heat stabilizers, flame retardants such as aluminum hydroxide and magnesium hydroxide, antistatic agents, glass and plastic balloons/beads, fillers such as metal powders and metal compounds, conductive fillers, and heat conductive fillers. In order to keep moderate flexibility and deformability as well as cushioning properties and mechanical strength of the foam base, the amount of the additives may be 0.1% by mass to 10% by mass in the foam base, or 1% by mass to 7% by mass.

<Physical Properties>

The foam base in the adhesive tape according to one or more embodiments of the present invention may have a tensile stress at 100% strain based on a stress-strain curve of 150 N/cm² or less, 1 N/cm² to 140 N/cm², 5 N/cm² to 130 N/cm², 10 N/cm² to 110 N/cm², 20 N/cm² to 100 N/cm², or 25 N/cm² to 90 N/cm². When the tensile stress at 100% strain based on a stress-strain curve of the foam base falls within this range, the adhesive tape according to one or more embodiments of the present invention can exhibit deformability that can withstand repeated bending and strength that is less likely to cause crease marks or tearing.

The tensile stress at 100% strain based on a stress-strain curve of the foam base refers to a tensile stress at 100% strain in a stress-strain curve (called S-S curve) measured by pulling a test piece made of the foam base with a gauge length of 2 cm and a width of 1 cm at a pulling speed of 300 mm/min using a tensile tester in a measurement environment of a temperature of 23° C. and a humidity of 50%.

The density of the foam base may be 0.2 g/cm³ to 2.0 g/cm³, 0.2 g/cm³ to 1.5 g/cm³, 0.2 g/cm³ to 1.0 g/cm³, or 0.3 g/cm³ to 0.7 g/cm³. When the density of the foam base falls within this range, the adhesive tape according to one or more embodiments of the present invention is easily adjusted to have deformability that can withstand repeated bending and strength that is less likely to cause crease marks or tearing, and to maintain the impact resistance.

In one or more embodiments of the present invention, the density of the foam base refers to apparent density. The apparent density is an apparent density measured in accordance with JISK6767 and refers to a value calculated based on the mass and the volume of approximately 15 cm³ of a foam cut into a 4 cm×5 cm rectangular piece.

The foam base used may have a compression strength at 25% of 1 kPa to 300 kPa, or 30 kPa to 250 kPa, in terms of enhancing the flex resistance of the adhesive tape, or 50 kPa to 200 kPa in terms of achieving higher flex resistance of the adhesive tape.

The compressive strength at 25% of the foam base is measured in accordance with JIS K6767. A sample cut into a 25 mm square is attached to a stainless steel plate with a larger area than the test piece, and the strength is measured when the sample is compressed by 25% of its initial thickness at a rate of 0.5 mm/min using a stainless probe with a diameter of 7 mm at 23° C. and 50% RH.

The elongation at break of the foam base, that is, the tensile elongation at break in a tensile test, may be 550% to 800%, 600% to 750%, or 650% to 700%, in terms of durability of the adhesive tape against repeated bending. When the elongation at break of the foam base falls within this range, the adhesive tape is easily adjusted to have deformability that can withstand repeated bending and strength that is less likely to cause crease marks or tearing while maintaining impact resistance.

The tensile strengths in the flow direction and the width direction of the foam base are not limited. The tensile strength in the flow direction may be 400 N/cm² to 1,000 N/cm², 450 N/cm² to 850 N/cm², or 500 N/cm² to 750 N/cm². The tensile strength in the width direction may be 300 N/cm² to 800 N/cm², 350 N/cm² to 650 N/cm², or 410 N/cm² to 550 N/cm². When the tensile strengths in the flow direction and the width direction of the foam base fall within the above ranges, the adhesive tape according to one or more embodiments of the present invention can be easily adjusted to have deformability that can withstand repeated bending and strength that is less likely to cause crease marks or tearing, and can achieve higher impact resistance and flex resistance.

The tensile strengths in the flow direction and the width direction of the foam base were measured in accordance with JISK6767. The tensile strength is the maximum strength of a sample with a gauge length of 2 cm and a width of 1 cm measured with a Tensilon tensile tester at a pulling speed of 300 mm/min at 23° C. and 50% RH.

The foam base may have a thickness of 50 μm or more, 75 μm or more, or 100 μm or more. When the thickness of the foam base falls within the above range, the adhesive tape being bent can be deformed without fully extending or shrinking and can have strength to such a degree that crease marks are not formed or tearing does not occur. The upper limit of the thickness of the foam base is not limited and can be set according to the size and the like of the electronic device to which the adhesive tape is applied. Specifically, the thickness of the foam base may be 50 μm to 500 μm, in a range of 75 μm to 400 μm, in a range of 100 μm to 300 μm, or in a range of 150 μm to 250 μm. When the thickness of the foam base falls within the above range, the adhesive tape being bent can be deformed without fully extending or shrinking and can have strength to such a degree that crease marks are not formed or tearing does not occur. In addition, the thickness of the electronic device to which the adhesive tape is applied can be reduced, and the design and the portability of the electronic device can be improved.

The thickness of the foam base is the average of the thicknesses measured at five locations at 100 mm intervals in the length direction and can be measured, for example, using Dial Thickness Gauge type G (from OZAKI MFG. CO., LTD.).

The foam base in one or more embodiments of the present invention may have a closed-cell foam structure, or may have an open-cell foam structure, or may have a foam structure in which a closed-cell foam structure and an open-cell foam structure are mixed. Among those, an open-cell structure is preferred, and an open-cell foam structure may make up 80% or more of the foam base or may make up 90% or more, because if so, the strength that is resistant against cracking upon impact can be achieved.

The above physical properties of the foam base in one or more embodiments of the present invention, such as tensile stress at 100% strain based on a stress-strain curve, density, compressive strength at 25%, and strength at break, can be adjusted as appropriate by the material and the foam structure of the foam base to be used and can also be adjusted by selecting and setting the conditions for producing the foam base as appropriate.

<Production Method>

The foam base can be produced by foaming a foamable resin composition at least containing an elastomer resin as a resin component and a thermal decomposition-type foaming agent. In addition to the elastomer resin and the thermal decomposition-type foaming agent, the foamable resin composition may contain optional components such as a resin other than the elastomer resin, a foaming aid, and additives as described below.

The method of producing the foam base is not limited, and, for example, the method at least includes a step of producing a foamable resin sheet by feeding the foamable resin composition to an extruder, melting and kneading the composition, and extruding a sheet from the extruder (foamable resin sheet forming step), a step of crosslinking the foamable resin sheet (crosslinking step), and a step of foaming the foamable resin sheet to produce a resin foam (foaming step). If necessary, the resin foam may be melted or softened and drawn in one or both of the flow direction and the width direction (drawing step). The drawing step may be performed once or multiple times.

The foamable resin sheet is crosslinked, for example, by irradiating the foamable resin sheet with ionizing radiation, or by blending an organic peroxide in advance in the foamable resin composition and heating the resulting foamable resin sheet to decompose the organic peroxide. These methods may be used in combination.

Examples of the ionizing radiation include electron beams, alpha rays, beta rays, and gamma rays. The dose of ionizing radiation may be adjusted as appropriate and may be in a range of 5 kGy to 200 kGy. The ionizing radiation may be applied to both surfaces of the foamable resin sheet, with the same dose, in order to form a uniform crosslinking structure and consequently to form a relatively uniform foam structure.

Examples of the organic peroxide include 1,1-bis(t-butylperoxy)3,3,5-trimethylcyclohexane, 1,1-bis(t-butylperoxy)cyclohexane, 2,2-bis(t-butylperoxy)octane, n-butyl-4,4-bis(t-butylperoxy)valerate, di-t-butyl peroxide, t-butylcumyl peroxide, dicumyl peroxide, α,α'-bis(t-butylperoxy-m-isopropyl)benzene, 2,5-dimethyl-2,5-di(t-butylperoxy)hexane, 2,5-dimethyl-2,5-di(t-butylperoxy)hexyne-3, benzoyl peroxide, cumyl peroxyneodecanoate, t-butyl peroxybenzoate, 2,5-dimethyl-2,5-di(benzoylperoxy)hexane, t-butylperoxyisopropyl carbonate, and t-butyl peroxy allyl carbonate. These may be used singly or in combination of two or more.

The amount of the organic peroxide added may be 0.01 parts by mass to 5 parts by mass and more or 0.1 parts by mass to 3 parts by mass per 100 parts by mass of the resin component in the foamable resin composition.

The amount of the thermal decomposition-type foaming agent added in the foamable resin composition may be determined as appropriate according to the expansion ratio of the foam base, and may be 1 part by mass to 40 parts by mass, or 1 part by mass to 30 parts by mass per 100 parts by mass of the resin component in the foamable resin composition.

The foamable resin sheet can be foamed by any method selected as appropriate according to the purpose. Examples of the method include heating by hot air, heating by infrared rays, using salt bath, and using oil bath, and these methods may be used in combination. Among these methods, heating by hot air and heating by infrared rays are preferred because if so, there is little difference between the front side and the back side in the appearance of the foam base surfaces.

The drawing of the foam base may be performed after foaming the foamable resin sheet to produce the foam base or may be performed while the foamable resin sheet is foamed. When the foam base is drawn after foaming the foamable resin sheet to produce the foam base, the foam base may be continuously drawn while the molten state at the time of foaming is kept without cooling the foam base, or the foam base may be drawn after the foam base is cooled and then heated again into a molten or softened state.

Here, the molten state of the foam base refers to a state in which the foam base is heated above the melting point of the resin component that constitutes the foam base. The softening of the foam base refers to a state in which the foam base is heated to a temperature equal to or higher than the softening point and lower than the melting point of the resin component that constitutes the foam base.

The foam base may be subjected to surface treatment such as corona treatment, flame treatment, plasma treatment, hot air treatment, ozone/ultraviolet treatment, or application of an adhesion-improving agent in order to enhance adhesiveness to the adhesive layer or another layer. In the surface treatment, the wetting index with a wetting reagent may be set to 36 mN/m or more, 40 mN/m or more, or 50 mN/m or more to achieve satisfactory adhesiveness to the adhesive layer. The foam base with enhanced adhesiveness may be laminated with the adhesive layer in a continuous process. The foam base with enhanced adhesiveness may be temporarily rolled up and stored and then laminated with the adhesive layer later in a separate process. When the foam base is temporarily rolled up, the foam base may be rolled with a slip sheet such as paper or a polyethylene, polypropylene, or polyester film in order to prevent blocking of the foam base with enhanced adhesiveness. A polypropylene film or a polyester film with a thickness of 25 μm or less is preferred.

(Adhesive Layer)

The adhesive tape can be used with an adhesive layer on one side or both sides of the foam base directly or with another layer interposed therebetween.

For example, an acrylic adhesive, a urethane adhesive, a synthetic rubber adhesive, a natural rubber adhesive, a silicone adhesive, or the like can be used to form the adhesive layer. Among those, an acrylic adhesive may be used to form the adhesive layer. It is preferable to use an acrylic adhesive at least containing as a base polymer an acrylic polymer obtained by polymerizing monomer components including (meth)acrylic monomers and containing, if necessary, a tackifier resin, a crosslinking agent, and the like.

Examples of the (meth)acrylic monomers that can be used in the production of the acrylic polymer include (meth)acrylates having an alkyl group having 1 to 12 carbon atoms, such as methyl (meth)acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth)acrylate, cyclohexyl (meth)acrylate, and 2-ethylhexyl (meth)acrylate.

Among those, it is preferable to use (meth)acrylates having an alkyl group having 4 to 12 carbon atoms as the (meth)acrylic monomers, and it is more preferable to use (meth)acrylates having an alkyl group having 4 to 8 carbon atoms. It is particularly preferable to use one or both of n-butyl acrylate and 2-ethylhexyl acrylate to achieve both high adhesive strength and high conformability to bending or deformation of an adherend and the foam base.

The (meth)acrylate having an alkyl group having 1 to 12 carbon atoms may be used in amount of 60% by mass or more of the total amount of monomers used in the production of the acrylic polymer, may be used in a range of 80% by mass to 98.5% by mass, or may be used in a range of 90% by mass to 98.5% by mass to achieve both high adhesive strength to an adherend and the foam base and high conformability to bending or deformation of an adherend and the foam base.

In the production of the acrylic polymer, highly polar vinyl monomers can be used as monomers. As the highly polar vinyl monomers, a vinyl monomer having a hydroxyl group, a vinyl monomer having a carboxyl group, a vinyl monomer having an amide group, and the like can be used singly or in combination of two or more.

As the monomer having a hydroxyl group, for example, (meth)acrylates having a hydroxyl group such as 2-hydroxyethyl (meth)acrylate, 2-hydroxypropyl (meth)acrylate, 4-hydroxybutyl (meth)acrylate, and 6-hydroxyhexyl (meth)acrylate can be used.

As the vinyl monomer having a carboxyl group, for example, acrylic acid, methacrylic acid, itaconic acid, maleic acid, (meth)acrylic acid dimer, crotonic acid, ethylene oxide-modified succinic acid acrylate, and the like can be used. Among those, the use of acrylic acid is preferred.

As the monomer having an amide group, for example, N-vinylpyrrolidone, N-vinylcaprolactam, acryloylmorpholine, acrylamide, N,N-dimethylacrylamide, and the like can be used.

Other examples of the highly polar vinyl monomers that can be used include vinyl acetate, ethylene oxide-modified succinic acid acrylate, and 2-acrylamido-2-methylpropanesulfonic acid.

The highly polar vinyl monomers may be used in a range of 1.5% by mass to 20% by mass of the total amount of monomers used in the production of the acrylic polymer, may be used in a range of 1.5% by mass to 10% by mass, or may be used in a range of 2% by mass to 8% by mass to achieve both high adhesive strength to an adherend and the foam base and high conformability to bending or deformation of an adherend and the foam base.

When the adhesive containing a crosslinking agent described below is used, an acrylic polymer having a functional group that reacts with the functional group of the crosslinking agent may be used as the acrylic polymer. An example of the functional group that the acrylic polymer may have is a hydroxyl group. The hydroxyl group can be introduced into the acrylic polymer, for example, by using a vinyl monomer having a hydroxyl group as the monomer.

The vinyl monomer having a hydroxyl group may be used in a range of 0.01% by mass to 1.0% by mass, or in a range of 0.03% by mass to 0.3% by mass of the total amount of monomers used in the production of the acrylic polymer.

The acrylic polymer can be produced by polymerizing the monomers by a method such as solution polymerization, bulk polymerization, suspension polymerization, or emulsion polymerization. Solution polymerization is preferred to improve the production efficiency of the acrylic polymer.

An example of the solution polymerization may be radical polymerization by mixing and stirring the monomers, a polymerization initiator, and an organic solvent at a temperature of 40° C. to 90° C.

Examples of the polymerization initiator include peroxides such as benzoyl peroxide and lauryl peroxide, azo-based thermal polymerization initiators such as azobisisobutyronitrile, acetophenone-based photopolymerization initiators, benzoin ether-based photopolymerization initiators, benzyl ketal-based photopolymerization initiators, acylphosphine oxide-based photopolymerization initiators, benzoin-based photopolymerization initiators, and benzophenone-based photopolymerization initiators.

The acrylic polymer obtained by the above method may be dissolved or dispersed in an organic solvent, for example, when produced by solution polymerization.

The acrylic polymer used may have a weight average molecular weight of 400,000 to 3,000,000, or a weight average molecular weight of 700,000 to 2,500,000. The weight average molecular weight is measured by gel permeation chromatography (GPC) and converted in terms of polystyrene. Specifically, the weight average molecular weight can be measured using a GPC system (HLC-8320GPC) from Tosoh Corporation under the following conditions.

Sample concentration: 0.5% by mass (tetrahydrofuran solution)
Sample injection volume: 100 μL
Eluent: tetrahydrofuran
Flow rate: 1.0 mL/min
Measuring temperature: 40° C.
Main columns: TSKgel GMHHR-H (20)×2
Guard column: TSKgel HXL-H
Detector: differential refractometer
Weight average molecular weight of standard polystyrene: 10,000 to 20,000,000 (from Tosoh Corporation)

The adhesive that can be used to form the adhesive layer may contain a tackifier resin in order to achieve both high adhesive strength to an adherend and the foam base and high conformability to bending or deformation of an adherend and the foam base.

Examples of the tackifier resin that can be used include rosin-based tackifier resins, polymerized rosin-based tackifier resins, polymerized rosin ester-based tackifier resins, rosin phenol-based tackifier resins, stabilized rosin ester-based tackifier resins, disproportionated rosin ester-based tackifier resins, hydrogenated rosin ester-based tackifier resins, terpene-based tackifier resins, terpene phenol-based tackifier resins, petroleum resin-based tackifier resins, and (meth)acrylate resin-based tackifier resins. When an emulsion-type adhesive is used as the adhesive, an emulsion-type tackifier resin may be used as the tackifier resin.

Among the tackifier resins listed above, disproportionated rosin ester-based tackifier resins, polymerized rosin ester-based tackifier resins, rosin phenol-based tackifier resins, hydrogenated rosin ester-based tackifier resins, (meth)acrylate resins, terpene phenol-based resins, and petroleum-based resins may be used singly or in combination of two or more.

It is preferable to use the tackifier resin having a softening point in a range of 30° C. to 180° C., or in a range of 70° C. to 140° C., to achieve both high adhesive strength to an adherend and the foam base and high conformability to bending or deformation of an adherend and the foam base. When the (meth)acrylate tackifier resin is used, it is preferable to use a (meth)acrylate tackifier resin with a glass transition temperature of 30° C. to 200° C., or 50° C. to 160° C.

The tackifier resin may be used in a range of 5 parts by mass to 65 parts by mass per 100 parts by mass of the acrylic polymer, or in a range of 8 parts by mass to 55 parts by mass to achieve both high adhesive strength to an adherend and the foam base and high conformability to bending or deformation of an adherend and the foam base.

The adhesive used to form the adhesive layer may contain a crosslinking agent in order to ensure high adhesive strength to an adherend and the foam base. For example, an isocyanate-based crosslinking agent, an epoxy-based crosslinking agent, a metal chelate-based crosslinking agent, or an aziridine-based crosslinking agent can be used as the crosslinking agent. Among those, it is preferable to use one or both of an isocyanate-based crosslinking agent and an epoxy-based crosslinking agent reactive with the acrylic polymer as the crosslinking agent. It is more preferable to use an isocyanate-based crosslinking agent.

Examples of the isocyanate-based crosslinking agent that can be used include tolylene diisocyanate, naphthylene-1,5-diisocyanate, hexamethylene diisocyanate, diphenylmethane diisocyanate, xylylene diisocyanate, and trimethylolpropane-modified tolylene diisocyanate. Tolylene diisocyanate and trimethylolpropane-modified tolylene diisocyanate are preferred.

The amount of the crosslinking agent may be selected such that the gel fraction in toluene in the adhesive layer is 40 to 80%, may be selected such that the gel fraction is 30% by mass to 70% by mass, or may be selected such that the gel fraction is 35% by mass to 65% by mass to produce an adhesive tape that achieves both high adhesive strength to an adherend and the foam base and high conformability to bending or deformation of an adherend and the foam base.

The gel fraction refers to a value measured by the method described below.

The adhesive layer was formed by coating a release treated surface of a release liner with the adhesive to a thickness after drying of 50 μm and drying the coating at 100° C. for three minutes, followed by aging at 40° C. for two days.

The adhesive layer was cut into a 50 mm long and 50 mm wide square as a test piece.

After the mass (G1) of the test piece was measured, the test piece was immersed in toluene at 23° C. for 24 hours.

After the immersion, the mixture of the test piece and toluene was filtered through a 300 mesh wire cloth to extract an insoluble component in toluene. The mass (G2) of the insoluble component dried for one hour at 110° C. was measured.

The gel fraction was calculated based on the mass (G1) and the mass (G2) and the following formula.

$$\text{Gel fraction (\% by mass)} = (G2/G1) \times 100$$

The adhesive that can be used may contain additives such as plasticizers, softeners, antioxidants, flame retardants, glass or plastic fibers or balloons, beads, fillers such as metals, metal oxides, and metal nitrides, coloring agents such as pigments and dyes, leveling agents, thickening agents, water repellent agents, and antifoaming agents.

The adhesive layer that can be formed using the adhesive may have a temperature (peak temperature) of −50° C. to 15° C. for the peak value of loss tangent (tan δ) at a frequency of 1 Hz, or −40° C. to 5° C. When the peak value of loss tangent of the adhesive layer falls within this range, satisfactory adhesiveness to an adherend at room temperature is easily imparted.

The temperature (peak temperature) for the peak value of loss tangent (tan δ) at a frequency of 1 Hz is determined by performing dynamic viscoelasticity measurement with temperature variance at a frequency of 1 Hz. The loss tangent (tan δ) at a frequency of 1 Hz is obtained from the storage modulus (G') and the modulus (G") obtained by the dynamic viscoelasticity measurement with temperature variance, using the formula: $\tan \delta = G''/G'$. The temperature at which tan δ shows its peak value is used. In dynamic viscoelasticity measurement, a viscoelasticity tester (from TA Instruments Japan, product name: ARES G2) is used. The adhesive layer formed to a thickness of approximately 2 mm as a test piece is placed between the parallel disks with a diameter of 8 mm serving as a measuring section of the tester, and the storage modulus (G') and the loss modulus (G") are measured from −50° C. to 150° C. at a frequency of 1 Hz.

The thickness of the adhesive layer in the adhesive tape may be 5 μm to 150 μm, 15 μm to 130 μm, or 25 μm to 100 μm to achieve both high adhesive strength to an adherend and the foam and high conformability to bending or deformation of an adherend or the foam base. The thickness of the adhesive layer refers to the average of a total of 25 thicknesses measured by cutting the adhesive tape in the width direction at five locations at 100 mm intervals in the length direction, and measuring the thickness of the adhesive layer at five points at 100 mm intervals in the width direction in each of the cut sections. The thickness can be measured using, for example, TH-104 Thickness Gauge for paper and films (from TESTER SANGYO CO., LTD.).

(Adhesive Tape)

The adhesive tape according to one or more embodiments of the present invention may be a single-sided adhesive type with an adhesive layer on only one side of the foam base or may be a double-sided adhesive type with adhesive layers on both sides of the foam base. Among them, the double-sided adhesive type with adhesive layers on both sides of the foam base is preferred. When the adhesive tape according to one or more embodiments of the present invention is the double-sided adhesive type, the adhesive layer on one side of the foam base and the adhesive layer on the other side may have the same composition and thickness, or at least one of the composition and the thickness may differ.

When indentation adhesive strength is measured with a 1 mm wide frame shape, the adhesive tape according to one or more embodiments of the present invention may have a strength value of 30 $N/cm^2$ or higher, 40 $N/cm^2$ or higher, or 50 $N/cm^2$ or higher. Increasing the adhesive strength in this method can ensure the adhesive strength required to fix the parts.

Figure 2:
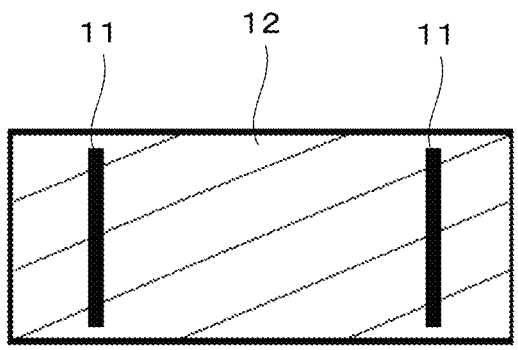
FIG. 2 is a schematic diagram illustrating a test piece used in an impact resistance test as viewed from the top.
Figure 3:
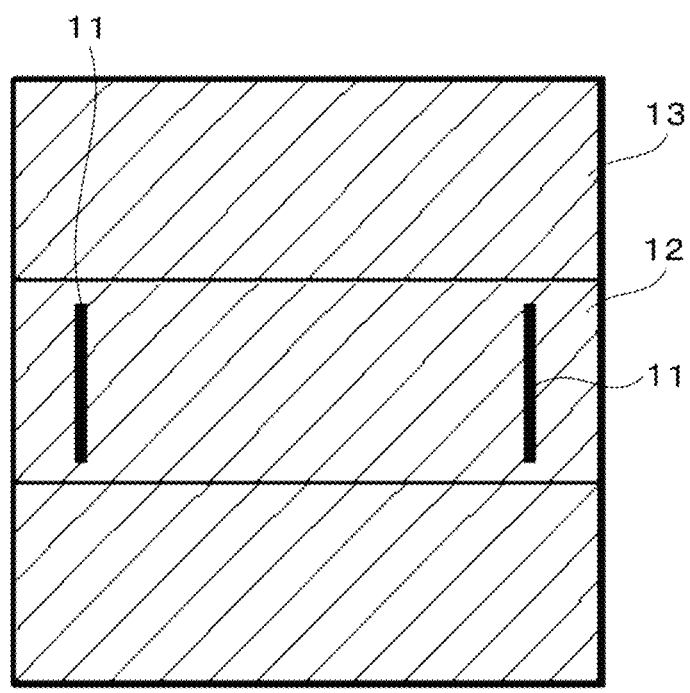
FIG. 3 is a schematic diagram illustrating a state in which the test piece used for the impact resistance test is attached to an acrylic sheet, as viewed from the top.

The indentation adhesive strength can be measured by the following method (1) to (3). The detailed drawings in the following measurement method (1) to (3) can be found in FIGS. 1 to 3 in WO 2018/230323.

(1) At 23° C., the adhesive sheet punched out into a window shape with outer dimensions of 15 mm square and a width of 1 mm is attached to a 2 mm thick and 20 mm square acrylic sheet (Acrylite MR200 (trade name) from MITSUBISHI RAYON CO., LTD., hue: transparent, same as below).

(2) Next, the acrylic sheet with the adhesive sheet prepared in (1) is attached to a 2 mm thick, 30×60 mm rectangular SUS sheet with a 10 mm diameter hole at the center such that the center of the acrylic sheet and the center of the SUS plate are aligned, and then the acrylic sheet and the SUS sheet are pressurized with a 2 kg roller with one round trip and left at 23° C. for one hour to make a test piece.

(3) The acrylic sheet is pushed through the hole in the SUS plate from the SUS side of the test piece using a tensile tester with an 8 mm diameter stainless steel probe at 10 mm/min, and the strength at which the acrylic sheet peels off is measured.

The adhesive tape according to one or more embodiments of the present invention may include other layers as needed in addition to the foam base and the adhesive layer. Examples of the other layers include laminate layers such as polyester films, light shielding layers, light reflective layers, and heat conductive layers such as metal layers to impart dimensional stability, satisfactory tensile strength, and removability of the adhesive tape.

The adhesive tape according to one or more embodiments of the present invention may have a release sheet laminated on a surface of the adhesive layer. Examples of the release sheet that can be used include films produced from synthetic resins such as polyethylene, polypropylene, and polyester, paper, non-woven fabric, cloth, foam sheets, or metal bases, and laminates thereof with release treatment such as silicone treatment, long-chain alkyl treatment, or fluorine treatment on at least one surface.

The adhesive tape according to one or more embodiments of the present invention may have a total thickness of 400 μm or less to contribute to thickness reduction of the electronic device. The total thickness may be 100 μm to 350 μm, 150 μm to 300 μm, or 200 μm to 350 μm so that the foam is less likely to be torn when the adhesive tape is peeled off when removed, high deformability can be exhibited without causing full extension or shrinkage, and satisfactory conformability to bending or deformation of an adherend or the foam base and to unevenness of the adherend can be achieved. The total thickness of the adhesive tape does not include the thickness of the release sheet.

(Production Method)

The adhesive tape according to one or more embodiments of the present invention can be produced, for example, by a direct method in which the adhesive is applied directly to the foam and dried, or by a transfer method in which the adhesive is applied to a release sheet and dried to form an adhesive layer and the adhesive layer is then laminated with the foam. When an acrylic adhesive containing an acrylic polymer and a crosslinking agent is used as the adhesive to form the adhesive layer, the adhesive layer laminated on one side or both sides of the foam by the direct method or the transfer method may be aged for 2 to 7 days at 20° C. to 50° C., or at 23° C. to 45° C. to achieve both high adhesive strength to an adherend and the foam base and high conformability to bending or deformation of an adherend and the foam base.

(Usage)

The adhesive tape according to one or more embodiments of the present invention can be used particularly suitably for, for example, adhesive fixing in a bent state or fixing at locations where repeated bending is required.

2. Article

The article according to one or more embodiments of the present invention is an article using the adhesive tape described in the above section "1. Adhesive Tape". The adhesive tape is attached to a member of an article and is suitably used for a member being bent in use, in particular, a member in which repeated bending operations is required.

The member being bent in use is often used as a member of articles such as electronic terminals such as smartphones and tablets, automobiles, building materials, office automation equipment (OA equipment), and home appliances.

Among those, the article according to one or more embodiments of the present invention may be an electronic device using the adhesive tape described in the above section "1. Adhesive Tape". Specific examples of the member of an electronic device include two or more housings that constitute an electronic terminal, a protective panel for an information display, an image display module, and a touch panel member.

The electronic device such as an electronic terminal having two or more housings, a protective panel for an information display, an image display module, and/or a touch panel member fixed by the adhesive tape described in the above section "1. Adhesive Tape" has high adhesive strength, can be bent repeatedly, and has durability that can withstand bending.

The present disclosure is not limited to the foregoing embodiments. The foregoing embodiments are illustrative, and any embodiment that has substantially the same configuration as the technical concept described in the claims of the present disclosure and achieves similar effects is included in the technical scope of the present disclosure.

EXAMPLES

One or more embodiments of the present invention will be described more specifically with examples and comparative examples.

[Preparation Example 1] Production Method for Acrylic Polymer (a-1)

In a reaction vessel equipped with a stirrer, a reflux condenser, a nitrogen inlet tube, and a thermometer, 75.94 parts by mass of n-butyl acrylate, 5 parts by mass of 2-ethylhexyl acrylate, 15 parts by mass of cyclohexyl acrylate, 4 parts by mass of acrylic acid, 0.06 parts by mass of 4-hydroxybutyl acrylate, and 200 parts by mass of ethyl acetate were charged, and the temperature was raised to 65° C. with nitrogen blown in with stirring.

Subsequently, to the resulting mixture, 4 parts by mass of a solution of 2,2'-azobisisobutyronitrile (solid content of 2.5% by mass) dissolved, in advance, in ethyl acetate was added, and the mixture was held at 65° C. for 10 hours with stirring.

The resulting mixture was then diluted with 98 parts by mass of ethyl acetate and filtered through a 200 mesh wire cloth to yield an acrylic polymer (a-1) solution with a weight average molecular weight of 1,600,000 (non-volatile content of 33% by mass).

[Preparation Example 2] Production Method for Acrylic Polymer (a-2)

In a reaction vessel equipped with a stirrer, a reflux condenser, a nitrogen inlet tube, and a thermometer, 93 parts by mass of n-butyl acrylate, 3.5 parts by mass of acrylic acid, 3.4 parts by mass of vinyl acetate, 0.1 parts by mass of hydroxyethyl acrylate, and 100 parts by mass of ethyl acetate were charged, and the temperature was raised to 72° C. with nitrogen blown in with stirring.

Subsequently, to the resulting mixture, 0.2 parts by mass of a solution of 2,2'-azobisisobutyronitrile (solid content of 0.1% by mass) dissolved, in advance, in ethyl acetate was added, and the mixture was held at 72° C. for 8 hours with stirring.

The resulting mixture was then diluted with 98 parts by mass of ethyl acetate and filtered through a 200 mesh wire cloth to yield an acrylic polymer (a-2) solution with a weight average molecular weight of 800,000.

[Preparation Example 3] Production Method for Acrylic Polymer (a-3)

In a reaction vessel equipped with a stirrer, a reflux condenser, a nitrogen inlet tube, and a thermometer, 97.95 parts by mass of n-butyl acrylate, 2 parts by mass of acrylic acid, 0.05 parts by mass of 4-hydroxybutyl acrylate, and 200 parts by mass of ethyl acetate were charged, and the temperature was raised to 65° C. with nitrogen blown in with stirring.

Subsequently, to the resulting mixture, 4 parts by mass of a solution of 2,2'-azobisisobutyronitrile (solid content of 2.5% by mass) dissolved, in advance, in ethyl acetate was added, and the mixture was held at 65° C. for 10 hours with stirring.

The resulting mixture was then diluted with 98 parts by mass of ethyl acetate and filtered through a 200 mesh wire cloth to yield an acrylic polymer (a-3) solution with a weight average molecular weight of 800,000 (non-volatile content of 33% by mass).

[Adhesive (A-1)]

In a container, to 100 parts by mass of the acrylic polymer (a-1), 5 parts by mass of polymerized rosin ester-based tackifier resin D-125 (ARAKAWA CHEMICAL INDUSTRIES, LTD.) and 15 parts by mass of petroleum-based tackifier resin FTR6125 (from Mitsui Chemicals, Inc.) were mixed and stirred, and then ethyl acetate was added to yield an adhesive solution with a solid content of 31% by mass.

Next, to 100 parts by mass of the adhesive solution, 1.0 part by mass of BURNOCK D-40 (from DIC Corporation, trimethylolpropane adduct of tolylene diisocyanate, isocyanate group content of 7% by mass, non-volatile content of 40% by mass) was added as a crosslinking agent and mixed by stirring to be homogenous. The mixture was then filtered through a 100 mesh wire cloth to yield an adhesive (A-1).

[Adhesive (A-2)]

In a container, to 100 parts by mass of the acrylic polymer (a-2), 20 parts by mass of polymerized rosin ester-based tackifier resin SUPER ESTER A100 (from ARAKAWA CHEMICAL INDUSTRIES, LTD.) and 20 parts by mass of petroleum-based tackifier resin FTR6100 (from Mitsui Chemicals, Inc.) were mixed and stirred, and then ethyl acetate was added to yield an adhesive solution with a solid content of 40% by mass.

Next, to 100 parts by mass of the adhesive solution, 1.24 parts by mass of BURNOCK D-40 (from DIC Corporation, trimethylolpropane adduct of tolylene diisocyanate, isocyanate group content of 7% by mass, non-volatile content of 40% by mass) was added as a crosslinking agent and mixed by stirring to be homogenous. The mixture was then filtered through a 100 mesh wire cloth to yield an adhesive (A-2).

[Adhesive (A-3)]

An adhesive (A-3) was obtained in the same manner as in the adhesive (A-1), except that the acrylic polymer (a-3) was used instead of the acrylic polymer (a-1) and the mass of BURNOCK D-40 was changed to 1.5 parts by mass.

Example 1

On a surface of a release liner, the adhesive (A-1) was applied using a bar coater so that the thickness of the adhesive layer after drying was 35 μm, and the adhesive was dried at 80° C. for 3 minutes to produce an adhesive layer.

The adhesive layer was then attached to both sides of a foam base (B-1) made of a thermoplastic elastomer resin [average thickness of 230 μm, tensile stress of 75 N/cm$^2$ at 100% strain based on a stress-strain curve, density of 0.51 g/cm$^3$, compressive strength at 25% of 142 kPa, elongation at break of 661%] in which the wetting index was adjusted to 50 mN/m by applying corona treatment to the surfaces. The adhesive layer was cured at 40° C. for 48 hours to produce an adhesive tape (P-1).

Example 2

An adhesive tape (P-2) was obtained in the same manner as in Example 1, except that the adhesive (A-2) was used instead of the adhesive (A-1).

Example 3

An adhesive tape (P-3) was obtained in the same manner as in Example 1, except that the thickness of the adhesive layer was changed from 35 μm to 90 μm and the foam base (B-1) was changed to a foam base (B-2) made of a thermoplastic elastomer resin [average thickness of 120 μm, tensile stress of 68 N/cm$^2$ at 100% strain based on a stress-strain curve, density of 0.51 g/cm$^3$, compressive strength at 25% of 142 kPa, elongation at break of 585%].

Example 4

An adhesive tape (P-4) was obtained in the same manner as in Example 1, except that the thickness of the adhesive layer was changed from 35 μm to 85 μm.

Example 5

An adhesive tape (P-5) was obtained in the same manner as in Example 1, except that the adhesive (A-3) was used instead of the adhesive (A-1).

Comparative Example 1

An adhesive tape (P-6) was obtained in the same manner as in Example 1, except that the thickness of the adhesive layer was changed from 35 μm to 50 μm and the foam base (B-1) was changed to a foam base (B-3) made of a non-elastomer resin [polyolefin-based foam base with an average thickness of 200 μm, tensile stress of 477 N/cm$^2$ at 100% strain based on a stress-strain curve, density of 0.49 g/cm$^3$, compressive strength at 25% of 466 kPa, elongation at break of 516%].

Comparative Example 2

An adhesive tape (P-7) was obtained in the same manner as in Comparative Example 1, except that the foam base (B-3) was changed to a foam base (B-4) made of a non-elastomer resin [polyolefin-based foam base with an average thickness of 200 μm, tensile stress of 156 N/cm$^2$ at 100% strain based on a stress-strain curve, density of 0.16 g/cm$^3$, compressive strength at 25% of 35 kPa, elongation at break of 487%].

Comparative Example 3

An adhesive tape (P-7) was obtained in the same manner as in Comparative Example 1, except that the foam base (B-3) was changed to a foam base (B-5) made of a thermoplastic elastomer resin [average thickness of 200 μm, tensile stress of 245 N/cm$^2$ at 100% strain based on a stress-strain curve, density of 0.56 g/cm$^3$, compressive strength at 25% of 328 kPa, elongation at break of 604%].

Comparative Example 4

An adhesive tape (P-8) was obtained in the same manner as in Comparative Example 1, except that the foam base (B-3) was changed to a foam base (B-6) made of a thermoplastic elastomer resin [average thickness of 200 μm, tensile stress of 155 N/cm$^2$ at 100% strain based on a stress-strain curve, density of 0.39 g/cm$^3$, compressive strength at 25% of 96 kPa, elongation at break of 643%].

The measurement and evaluation methods for the adhesive tapes obtained in the examples and the comparative examples will now be described.

<Physical Properties of Foam Base>

The density, the tensile stress at 100% strain based on a stress-strain curve, the tensile strengths in the flow direction and the width direction, the compressive strength at 25%, and the elongation at break of the foam bases used in the examples and the comparative examples were measured by the same methods as described above. The physical properties of the foam bases are listed in Table 1.

<Thickness of Adhesive Layer, Thickness of Foam Base, and Total Thickness of Adhesive Tape>

The "thickness of the adhesive layer" in the adhesive tape obtained in the examples and the comparative examples refers to the average of a total of 25 thicknesses measured by cutting the adhesive tape in the width direction at five locations at 100 mm intervals in the length direction, and measuring the thickness of the adhesive layer at five points at 100 mm intervals in the width direction in each of the cut sections using TH-104 Thickness Gauge for paper and films (from TESTER SANGYO CO., LTD.).

The thickness of the foam base in the adhesive tape obtained in the examples and the comparative examples is the average of the thicknesses at five locations at 100 mm intervals in the length direction measured using Dial Thickness Gauge type G from OZAKI MFG. CO., LTD.

The total thickness of the adhesive tape obtained in the examples and the comparative examples is the thickness after removing the release liner and is the average of the thicknesses at five locations at 100 mm intervals in the length direction measured using Dial Thickness Gauge type G from OZAKI MFG. CO., LTD.

<Gel Fraction and Peak Temperature of Loss Tangent (tan δ) at 1 Hz Frequency of Adhesive Layer>

The gel fraction and the peak temperature of the loss tangent (tan δ) at a frequency of 1 Hz of the adhesive layer in the adhesive tape obtained in the examples and the comparative examples were measured by the methods described above. The results are listed in Tables 2 and 3.

<Evaluation Method for Impact Resistance>

Two pieces of adhesive tape 11 cut to a length of 20 mm and a width of 2 mm were attached in parallel with a gap of 40 mm to a polycarbonate plate 12 with a thickness of 2 mm and outer dimensions of 25 mm×50 mm (see FIG. 2), and then attached to an acrylic sheet 13 with a thickness of 2 mm and outer dimensions of 50 mm×50 mm (trade name: Acrylite L from MITSUBISHI RAYON CO., LTD., hue: transparent) at the center (see FIG. 3). They were pressurized at 50 N/cm$^2$ for 10 seconds and left at 23° C. for 24 hours to make a test piece.

Figure 4:
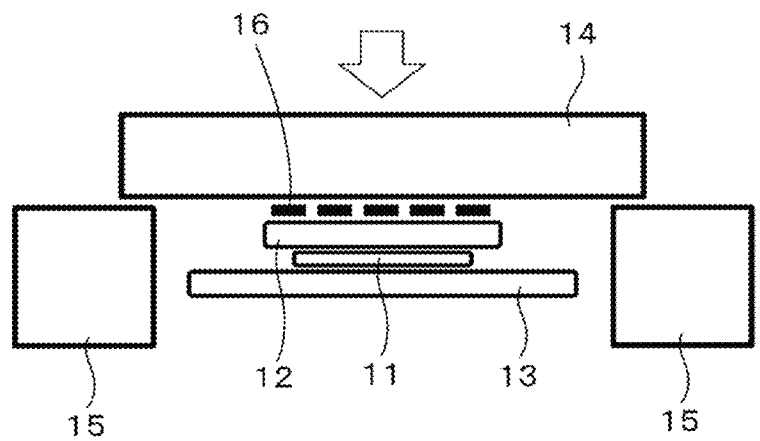
FIG. 4 is a schematic diagram illustrating a testing method for the impact resistance test.

Subsequently, metal pedestals 15 were placed on the table of a DuPont impact tester (from TESTER SANGYO CO., LTD.). A weight 14 of 300 g was attached to the test piece on the polycarbonate plate 12 with tape 16 (see FIG. 4). From a height of 30 cm, an impact punch was dropped five times at 10 second intervals on the test piece with the acrylic sheet 13 facedown. After the dropping, the test piece was visually checked, and if peeling of the adhesive tape 11 of the test piece or breakage of the test piece was not found, the impact punch was dropped from a position 10 cm higher (40 cm) five times at 10 second intervals. Such a test was repeated, and the fall height of the impact punch was measured when peeling of the adhesive tape of the test piece or breakage of the test piece was found. The evaluation was made based on the following criteria.

[Evaluation Criteria]

A: The fall height of the impact punch was 80 cm or more.

B: The fall height of the impact punch was 50 cm to less than 80 cm.

D: The fall height of the impact punch was less than 50 cm.

<Evaluation Method for Flex Resistance>

[Evaluation Method for Resistance Against Repeated Bending (Inward Bending Resistance)]

Figures 5A, 5B:
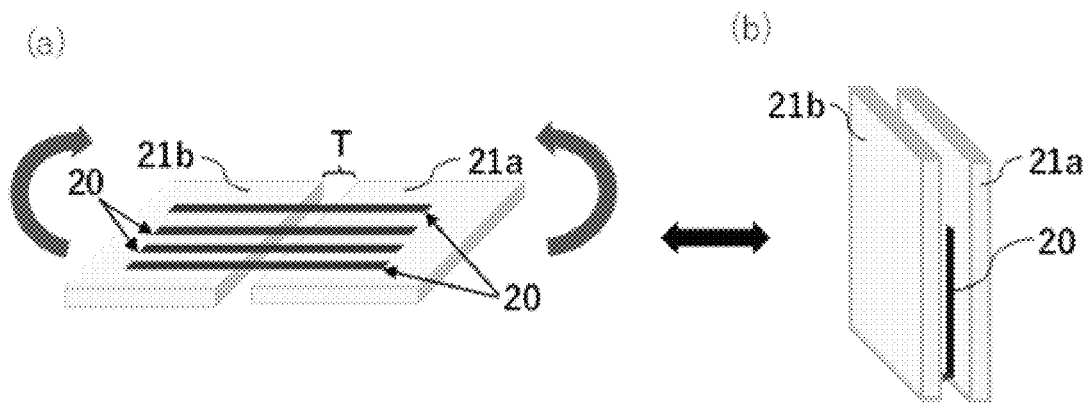
FIGS. 5A and 5B are schematic diagrams illustrating a testing method for resistance against repeated bending.

As illustrated in FIG. 5A, the adhesive tape (test tape) 20 cut into a width of 10 mm and a length of 200 mm was attached across the surfaces of two 2 mm thick acrylic sheets 21a and 21b placed horizontally with a spacing T of 1 cm to make a test piece. As illustrated in FIG. 5B, the tape was bent until the two acrylic sheets 21a and 21b were parallel, with the surfaces having the test tape 20 facing inside, and then the two acrylic sheets 21a and 21b were returned again to the original arrangement illustrated in FIG. 5A. This cycle was repeated 200,000 times. The adhesive tape (test tape) in the test piece after the cycle test was visually observed and evaluated according to the following evaluation criteria.

[Evaluation Criteria]

B: No crease mark was formed on the test tape and no tearing of the test tape occurred.

D: Crease marks were formed on the test tape.

[Evaluation Method for Outward Bending Resistance]

Figures 6A, 6B:
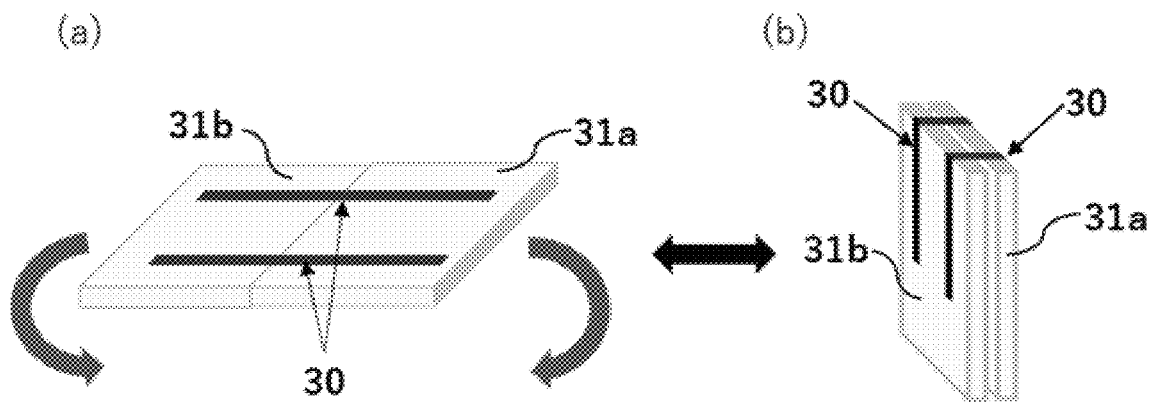
FIGS. 6A and 6B are schematic diagrams illustrating a testing method for outward bending resistance.

As illustrated in FIG. 6A, the adhesive tape (test tape) 30 cut into a width of 5 mm and a length of 50 mm was attached across the surfaces of two 2 mm thick acrylic sheets 31a and 31b placed horizontally with no spacing to make a test piece. The two acrylic sheets 31a and 31b were folded with the surfaces not having test tape 30 facing inside as illustrated in FIG. 6B, and the two acrylic sheets 31a and 31b were returned again to the original arrangement illustrated in FIG. 6A. This cycle was counted as one bending cycle. The adhesive tape (test tape) in the test piece after the cycle test was visually observed and evaluated according to the following evaluation criteria.

[Evaluation Criteria]

B: The test tape did not fully extend after 10 bending cycles, and the distance between the two acrylic sheets was less than 1 mm.

C: The test tape did not fully extend after 5 bending cycles and the distance between the two acrylic sheets was less than 1 mm, but after 10 bending cycles, the test tape fully extended and the distance between the two acrylic sheets expanded to 1 mm or more.

D: The test tape fully extended after one bending cycle, and the distance between the two acrylic sheets expanded to 1 mm or more.

The evaluation results are listed in Tables 2 and 3.

TABLE 1

| Foam base | | B-1 | B-2 | B-3 | B-4 | B-5 | B-6 |
|---|---|---|---|---|---|---|---|
| Resin (main component) constituting the foam base | | Elastomer | Elastomer | Polyolefin non-elastomer | Polyolefin non-elastomer | Elastomer | Elastomer |
| Thickness | [μm] | 230 | 120 | 200 | 200 | 200 | 200 |
| Tensile stress at 100% strain based on stress-strain curve | [N/cm$^2$] | 75 | 68 | 477 | 156 | 245 | 155 |
| Foam density | [g/cm$^3$] | 0.51 | 0.51 | 0.49 | 0.16 | 0.56 | 0.39 |
| Elongation at break | [%] | 661 | 585 | 516 | 487 | 604 | 643 |
| Flow direction Tensile strength | [N/cm$^2$] | 704 | 523 | 1475 | 458 | 753 | 617 |

TABLE 1-continued

| Foam base | | B-1 | B-2 | B-3 | B-4 | B-5 | B-6 |
|---|---|---|---|---|---|---|---|
| Width direction Tensile strength | [N/cm$^2$] | 535 | 423 | 931 | 306 | 812 | 402 |
| Compressive strength at 25% | [kPa] | 142 | 142 | 466 | 35 | 328 | 96 |

TABLE 2

| | | Example 1 | Example 2 | Example 3 | Example 4 | Example 5 |
|---|---|---|---|---|---|---|
| Adhesive layer | Adhesive | A-1 | A-2 | A-1 | A-1 | A-3 |
| | Thickness [μm] | 35 | 35 | 90 | 85 | 35 |
| | Gel fraction [%] | 52 | 47 | 52 | 52 | 34 |
| | Peak temperature [° C.] of loss tangent (tanδ) | −5 | −38 | −5 | −5 | 2 |
| Foam base | Foam base type | B-1 | B-1 | B-2 | B-1 | B-1 |
| | Thickness [μm] | 230 | 230 | 120 | 230 | 230 |
| Adhesive tape | Total thickness [μm] | 300 | 300 | 300 | 400 | 300 |
| Impact resistance | Evaluation | A | A | B | A | A |
| | Height [cm] | 100 | 95 | 50 | 85 | 80 |
| Flex resistance | Resistance against repeated bending | B | B | B | B | B |
| | Outward bending resistance | B | B | B | B | B |

TABLE 3

| | | Comparative Example 1 | Comparative Example 2 | Comparative Example 3 | Comparative Example 4 |
|---|---|---|---|---|---|
| Adhesive layer | Adhesive | A-1 | A-1 | A-1 | A-1 |
| | Thickness [μm] | 50 | 50 | 50 | 50 |
| | Gel fraction [%] | 52 | 52 | 52 | 52 |
| | Peak temperature [° C.] of loss tangent (tanδ) | −5 | −5 | −5 | −5 |
| Foam base | Foam base type | B-3 | B-4 | B-5 | B-6 |
| | Thickness [μm] | 200 | 200 | 200 | 200 |
| Adhesive tape | Total thickness [μm] | 300 | 300 | 300 | 300 |
| Impact resistance | Evaluation | B | D | B | B |
| | Height [cm] | 70 | 40 | 60 | 70 |
| Flex resistance | Resistance against repeated bending | D | D | D | D |
| | Outward bending resistance | D | C | D | C |

The adhesive tapes of Examples 1 to 5 had high impact resistance, had satisfactory inward bending resistance and outward bending resistance, and exhibited high flex resistance. On the other hand, Comparative Examples 1 to 4 failed to achieve both impact resistance and flex resistance.

Although the disclosure has been described with respect to only a limited number of embodiments, those skilled in the are, having benefit of this disclosure, will appreciate that various other embodiments may be devised without departing from the scope of the present disclosure. Accordingly, the scope of the invention should be limited only by the attached claims.

What is claimed is:

1. An adhesive tape comprising an adhesive layer on one side or both sides of a foam base directly or with another layer interposed therebetween, wherein:
the foam base contains an elastomer resin as a main component, and
the foam base has a tensile stress of 68 N/cm$^2$ or more and 150 N/cm$^2$ or less at 100% strain based on a stress-strain curve and a foam density of 0.2 g/cm$^3$ to 2.0 g/cm$^3$.

2. The adhesive tape according to claim 1, wherein the foam base has a compressive strength at 25% of 1 kPa to 300 kPa.

3. The adhesive tape according to claim 1, wherein the foam base has an elongation at break of 550% to 800%.

4. The adhesive tape according to claim 1, wherein the foam base has a thickness of 50 μm to 500 μm.

5. The adhesive tape according to claim 1, wherein the adhesive layer is formed of an acrylic adhesive.

6. An electronic device comprising the adhesive tape according to claim 1.

7. The adhesive tape according to claim 1, wherein the elastomer resin that constitutes the foam base comprises a styrenic thermoplastic elastomer.

8. The adhesive tape according to claim 1, wherein the elastomer resin that constitutes the foam base comprises a non-crosslinked elastomer.

\* \* \* \* \*